US 6,539,608 B2

(12) United States Patent
McKinnon et al.

(10) Patent No.: US 6,539,608 B2
(45) Date of Patent: Apr. 1, 2003

(54) ANTENNA DIELECTRIC

(75) Inventors: John Peter Bruce McKinnon, Paignton (GB); Mark Hanley Arnold, Nr Tavistock (GB); Michael John McAlinden, Brixham (GB)

(73) Assignee: Nortel Networks Limited, St. Laurent (CA)

( * ) Notice: Subject to any disclaimer, the term of this patent is extended or adjusted under 35 U.S.C. 154(b) by 139 days.

(21) Appl. No.: 09/736,865

(22) Filed: Dec. 14, 2000

(65) Prior Publication Data

US 2001/0018793 A1 Sep. 6, 2001

Related U.S. Application Data

(63) Continuation of application No. 09/202,484, filed as application No. PCT/GB97/01697 on Jun. 25, 1997, now abandoned.

(30) Foreign Application Priority Data

Jun. 25, 1996 (GB) ............................... 9613304
Jun. 25, 1996 (GB) ............................... 9613305

(51) Int. Cl.$^7$ ............................................... H01Q 13/00
(52) U.S. Cl. .......................................... 29/600; 29/825
(58) Field of Search .................................... 29/600, 825

(56) References Cited

U.S. PATENT DOCUMENTS 3,816,836 A * 6/1974 Smith 5,845,391 A * 12/1998 Bellus et al.

FOREIGN PATENT DOCUMENTS

| GB | 2 261 554 | 5/1993 |
| JP | 60-206304 | * 10/1985 |
| JP | 02-035803 | * 2/1990 |
| JP | 09-174596 | * 7/1997 |
| JP | 10-209745 | * 8/1998 |

OTHER PUBLICATIONS

MID Antenna annd new Plastic Shield Shell for Handheld Cellular Phones, paper by F. Baba, Y. Imanishi, S. Shinya, K Tsunekawa presented at MID'96 Molded Interconnect Devices, $2^{nd}$ International congress pp. 99–105.*

* cited by examiner

Primary Examiner—Carl J. Arbes
(74) Attorney, Agent, or Firm—Barnes & Thornburg

(57) ABSTRACT

The present invention provides an antenna dielectric having a thickness of less than 3 mm, having a relative dielectric permitivity approaching that of air whereby circuit and transmission line losses are minimised. In accordance with another aspect of the invention, there is provided an antenna ground plane substrate comprising an expanded polystyrene substrate produced by a two-stage moulding process. The two-stage polystyrene is coated with a conductive coating to provide a conductive surface of uniform smoothness and of light weight.

8 Claims, 2 Drawing Sheets

ANTENNA DIELECTRIC

This application is a continuation of application Ser. No. 09/202,484, filed Dec. 10, 1998, now abandoned, which is a 371 of PCT/GB97/01697, filed Jun. 25, 1997.

FIELD OF THE INVENTION

This invention relates to antennas employing dielectric such as flat plate antennas.

BACKGROUND TO THE INVENTION

One form of antenna that is in widespread use is the triplate antenna (also known as a layered antenna) which, in one form, comprises a radiating element including a pair of closely spaced correspondingly apertured ground planes with an interposed printed film circuit, electrically isolated from the ground planes, the film circuit providing excitation elements or probes within the areas of the apertures, to form dipoles, and a feed network for the dipoles. In an array antenna a plurality of such aperture/element configurations are spaced at regular intervals co-linearly in the overall triplate structure. This antenna construction lends itself to a cheap yet effective construction for a linear array antenna such as may be utilised for a cellular telephone base station. Such an antenna is disclosed in our co-pending patent application No. EP-A-6B2261554B.

Another type of layered antenna array comprises a single aperture per radiating element. A further type of antenna comprises a primary aperture with two secondary apertures placed on opposite sides of the primary aperture. Such arrays may extend in a single direction (a linear array) or in two directions (a planar array). Alternatively, a number of linear arrays may be spaced apart to form a multi-antenna planar array.

Another type of linear array comprises apertures in both ground planes of each radiating element. An important factor in the design of an antenna is the gain of the antenna. In order to increase the gain from the antenna in a primary radiating direction, the antenna may further comprise a continuous (non-apertured) ground plane placed parallel with and spaced from one of the apertured ground planes to form a rear reflector for the antenna. Signals transmitted by the antenna towards the back plane are re-radiated in a forward direction. Provision of a reflector can increase the gain in front of the antenna whilst reducing the gain behind.

A further type of antenna with a single ground plane is the patch antenna which comprises a reflective ground plane and a dielectric sheet which is supported from the ground plane by a dielectric spacer and supports a microstrip pattern comprising printed patch radiating elements.

A further type of antenna is the patch antenna which comprises a reflective ground plane and a dielectric film or sheet which supports a microstrip pattern comprising printed patch radiating elements, which dielectric sheet is supported from the ground plane by a dielectric spacer.

A still further form of antenna is the dipole antenna in which a pair of colinear quarter wavelength radiators are fed in anti-phase to produce a substantially omni-directional radiation pattern in a plane normal to the axis of the radiators. If the radiators are placed parallel to and a quarter of a wavelength from a reflecting ground plane the radiation pattern similarly becomes substantially directional, see e.g. EP-B-054351 (Northern Telecom).

For modern telecommunications application at high frequencies, e.g. above 100 MHz, apart from the electrical performance of the antenna other factors need to be taken into account, such as size, weight, cost and ease of construction of the antenna. Depending on the requirements, an antenna can be either a single radiating element (e.g. one dipole) or an array of like radiating elements. With the increasing deployment of cellular radio, an increasing number of base stations which communicate with mobile handsets are required. Similarly an increasing number of antennas are required for the deployment of fixed radio access systems, both at the subscribers premises and base stations. Such antennas are required to be both inexpensive and easy to produce. A further requirement is that the antenna structures be of light weight yet of sufficient strength to be placed on the top of support poles, rooftops and similar places and maintain long term performance over environmental extremes.

The antennas described above have spacers to separate the various dielectric film or ground plane layers. Whilst some types of antennas have employed rigid dielectric boards, made from, for instance, FR4 or PTFE, mostly foamed dielectric has been employed. FR4 or PTFE circuit boards whilst having controllable dielectric permitivities, require solid supports to maintain their position relative to a ground plane, are expensive, both by way of raw material and in the manufacture of an antenna. Polystyrene is cheap, has a near unity dielectric constant, is of low loss and will support a dielectric sheet for circuitry, but presently cannot normally produced at a thickness of less than 4 mm by normal manufacturing techniques, in any case no thinner than 3 mm (when the tolerances have proved not to be good). It has not been possible to obtain thin polystyrene with repeatable tight tolerances cheaply. The dimensions of the mould allowing an even distribution of polystyrene to be expanded is one of reasons why this is so. In order to minimise circuit radiation losses, there is a requirement for thinner substrates; this would also reduce overmoding (which is the support of modes of propagation other than the intended mode(s). An acceptable range of characteristic impedances must also be realised for the transmission lines. Typically a thickness of 2 mm is sufficiently thin, with a tolerance of around ±5%. The Applicants have designed antennas with 1.6 mm spacing which was found to be impractical as tolerances of 10% to ensure good antenna return loss give rise to variations of ±0.16 mm; every antenna had to be individually matched with matching stubs and the like—economic production is not possible.

One part of an antenna which is particularly heavy are the grounding elements, comprising one or more ground planes. As described above, the ground planes may be several in number and must have an electrically conductive surface and be of a low resistivity per square whereby the microwave surface currents may propagate. Typically ground planes have been formed from a metal casting or sheet, typically from an aluminium alloy for reasons of weight or from plated steel for reasons of cost. Nevertheless, the weight of the ground planes, whether formed from an alloy or not, comprises a considerable amount of the overall weight of an antenna structure.

Dielectrics such as expanded polystyrene have not previously been successfully metallised and employed as ground planes, since the surface roughness of the polystyrene would result in any surface metallisation having a rough surface due to boundary interstitial voids (spaces between aggregated polystyrene groups at a surface). The technique of sputter coating or electroless plating of plastics such as ABS plastics is known, but this type of coating is not suitable for non-rigid plastics materials such as polystyrene, where cracking of the coating would result upon stressing or flexing. Dielectrics such as polystyrene as commonly produced have poor dimensional tolerances which prevents their use in the creation of structures other than that as a resilient spacer. EP-B-447 018 (Northern Telecom) provides an antenna wherein a dielectric film supporting an antenna feed and probe arrangement is maintained in a spaced apart relation with respect to two apertured ground planes by means of a flexible foamed dielectric either side of the film; the tolerances of the dielectric are not critical since the resilient foam urges the ground planes to a maximum spaced apart distance. If the foam was 15% oversize, then the ground plane separation will not vary; the foam spacer will be compressed further.

As is known, in the case of microwave propagation, the top surface (the boundary surface interfacing with the dielectric) carries the microwave signals by way of the skin effect. The lower frequency components flow in the bulk of the material. If the surface of a ground plane is rough, then it will not sustain controlled radio frequency propagation; at best, the effect of a rough surface would be to degrade the RF circuit. The advantage of a good ground plane surface finish to give lowest RF losses, is apparent for the many cases of ground planes, for example, cavity backing, conventional ground plane or apertured (radiating) ground plane, balanced (triplate) or unbalanced (microstrip).

OBJECT OF THE INVENTION

An object of the invention is to provide an antenna dielectric having a thickness of less than 3 mm, having a relative dielectric permitivity approaching that of air whereby circuit and transmission line losses are minimised. It is also an object of the invention to provide a method for producing an antenna dielectric having a thickness of less than 3 mm.

It is a still further object of the invention to provide an antenna ground plane structure which is light in weight. It is also an object of the invention to provide an antenna which can be easily and cheaply produced on a mass production basis.

It is a yet further object of the invention to provide a ground plane carried on substrate—that is an integral dielectric spacer and ground plane, whereby the separate track and ground plane tolerances are minimised, without recourse to procedures such as the bonding or clamping of a substrate to a separate ground plane.

STATEMENT OF THE INVENTION

In accordance with the invention, there is provided an antenna having a dielectric element formed from expanded polystyrene produced by a method comprising the steps;
  passing steam over unexpanded polystyrene beads whereby the beads expand to a first expanded state;
  introducing the beads into a ventilated silo;
  allowing the beads to cool whereby stabilising agents and moisture evaporate and interstitial voids fill with air;
  introducing the beads into a two-position mould cavity in a first position dimensioned to enable a uniform distribution of beads;
  reducing the size of the cavity passing steam through the mould whereby the polystyrene beads further expand;
  reducing the pressure within the mould to a partial vacuum whereby the polystyrene cools and assumes a solid state and the moisture due to the steam is removed; and removing the substrate from the mould and heating the substrate at a temperature above ambient in dry air.

By the use of this two stage manufacturing process, substrates having a thickness of less than 2 mm can reliably be produced, with a high degree of surface smoothness and cell closure. One important advantage of the arrangement is that the ground plane substrate can also serve the function of a dielectric spacer between the ground plane and a feed network or any further, apertured ground plane, thereby decreasing the number of components of the antenna, simplifying the manufacture, further reducing unit cost.

Said dielectric spacer can be positioned between a feed network and a ground plane.

In accordance with another aspect of the invention, there is provided a conductive expanded polystyrene antenna substrate, the substrate being produced by the same process as described above yet with a further method step comprising coating the substrate with a conductive coating. Said antenna can include a reflector plane spaced from the rear of the antenna, which reflector plane comprises said dielectric element coated with a conductive coating, which coating is connected to earth.

In accordance with the invention, there is provided a dielectric element formed from expanded polystyrene produced by a method comprising the steps;
  passing steam over unexpanded polystyrene beads whereby the beads expand to a first expanded state;
  introducing the beads into a ventilated silo;
  allowing the beads to cool whereby stabilising agents and moisture evaporate and interstitial voids fill with air;
  introducing the beads into a two-position mould cavity in a first position dimensioned to enable a uniform distribution of beads;
  reducing the size of the cavity passing steam through the mould whereby the polystyrene beads further expand;
  reducing the pressure within the mould to a partial vacuum whereby the polystyrene cools and assumes a solid state and the moisture due to the steam is removed;
  removing the substrate from the mould and heating the substrate at a temperature above ambient in dry air; and
  coating the substrate with a conductive coating.

Preferably, the conductive coating is non-polymer based further comprising. Preferably, the conductive coating is an aqueous based thermoplastic resin binder metal pigment. Such a metal pigment can be selected from the group comprising silver, silver plated copper, nickel and gold.

The antenna can be a layered antenna, wherein the feed network and the probes are formed as a printed circuit pattern on a dielectric substrate.

The present invention thus satisfies a requirement for thinner substrates whereby to produce lighter and more compact antennas, and also to provide a dielectric which can minimise circuit radiation losses. A further advantage of having a thin dielectric is that, with respect to transmission lines on the dielectric sheets, there would also be a reduction in over moding. Over moding occurs when several modes of propagation other than the desired mode are supported and sometimes results in the suppression of the preferred mode of propagation—in particular the half wave in the transverse mode whilst still realising the an acceptable a range of characteristic impedances for the transmission lines. Below 5 GHz, typically a dielectric thickness as low as 2 mm will prevent overmoding.

By the use of this two stage manufacturing process, substrates having a thickness of less than 2 mm can reliably be produced, with a high degree of surface smoothness and cell closure. Such two-stage polystyrene is then coated with a conductive coating to provide a conductive surface of uniform smoothness to enable the substrate to be employed in antenna conductive plane applications, for example, when the conductive coating is connected to an earth potential. Preferably the conductive coating is a metal pigment held in a thermo plastic resin with an aqueous solvent which is applied by spray.

In accordance with another aspect of the invention the electrical connection to the antenna array elements and/or ground plane can be made employing a compression contact. This dispenses with the need for a connection formed by, for example, soldering which would compromise the integrity of the structure.

One advantage of the arrangement is that the ground plane substrate can also serve the function of a dielectric spacer between the ground plane and a feed network or any further ground plane, such as an apertured ground plane, thereby decreasing the number of components of the antenna, simplifying the manufacture, further reducing unit cost. Polystyrene possesses a dielectric constant which is close to that of air—i.e. near unity dielectric constant, and is of low loss. This also minimises the effect of variations in tolerances between the separate track and ground plane, without recourse to procedures such as the bonding or clamping of a substrate to a separate ground plane.

In accordance with a further aspect of the invention, there is provided a method of producing an antenna dielectric element from expanded polystyrene produced by a method comprising the steps;

passing steam over unexpanded polystyrene beads whereby the beads expand to a first expanded state;

introducing the beads into a ventilated silo;

allowing the beads to cool whereby stabilising agents and moisture evaporate and interstitial voids fill with air;

introducing the beads into a two-position mould cavity in a first position dimensioned to enable a uniform distribution of beads;

reducing the size of the cavity passing steam through the mould whereby the polystyrene beads further expand;

reducing the pressure within the mould to a partial vacuum whereby the polystyrene cools and assumes a solid state and the moisture due to the steam is removed; and removing the substrate from the mould and heating the substrate at a temperature above ambient in dry air.

In accordance with a further aspect of the invention, there is provided a method of producing a conductive expanded polystyrene antenna substrate, the method further including the step of coating the substrate with a conductive coating.

In accordance with a further aspect of the invention, there is provided a method of transmitting microwave signals comprising the steps of providing microwave signals to a radiating probe over a feed network; said feed network being supported by a dielectric manufactured in accordance with this method.

BRIEF DESCRIPTION OF THE DRAWINGS

In order that the present invention is more fully understood show how the same may be carried into effect, reference shall now be made, by way of example only, to the Figures as shown in the accompanying drawing sheets, wherein.

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific examples described.

Figure 1:
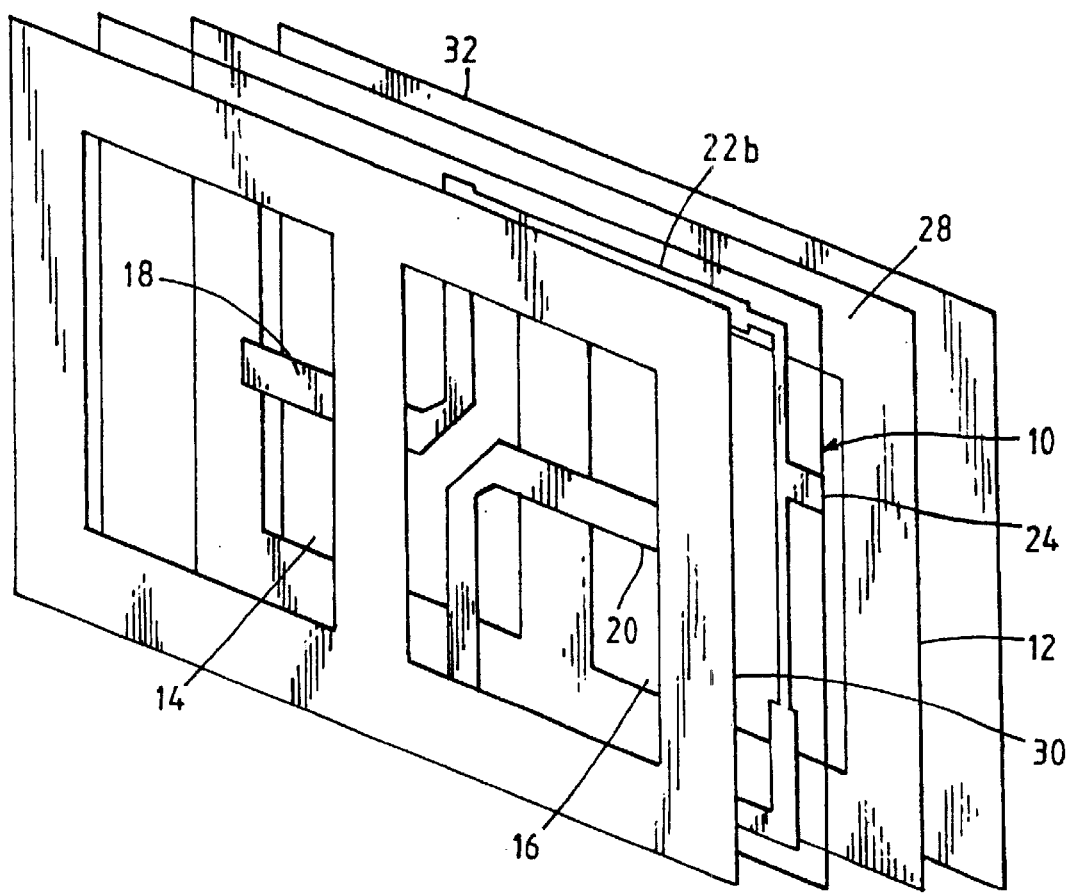
FIG. 1 an exploded perspective view of a triplate single element antenna having a dipole pair with a feed network formed in microstrip, with a back reflector.

FIG. 1 shows one type of antenna to which the present invention is applicable. The flat plate antenna element comprises a dielectric substrate 10 which is positioned between two apertured metallic ground planes 12, 30. A further reflecting ground plane 32 is spaced from ground plane 12 to provide a degree of directionality for the antenna. The dielectric substrate supports, on one side of the substrate, a metallisation pattern 22 which provides a feed network for a pair of radiating probes 18, 20. The apertured ground planes each have a pair of identical rectangular apertures 14, 16 and are positioned whereby the probes may radiate in a primary radiating direction. A feed point 24 is provided for connection to an external feed (not shown).

The feed network 22 is positioned so as to form a microstrip transmission line with portions of the ground plane defining the rectangular apertures. The position of the feed point 24 is chosen so that when an r.f. signal of a given frequency is fed to the network the relative lengths of the two portions 22a and 22b of the network are such as to cause the pair of probes 18 and 20 to be fed in anti-phase, thereby creating a dipole antenna radiating element structure. Furthermore, the dimensions of the rectangular apertures and the bounding portions of the ground plane are chosen so that the bounding portions 26, 28 parallel with the probes 18, 20 act as parasitic antenna radiating elements, which together with the pair of radiating probes 18, 20 shape the radiation pattern of the antenna.

The ground planes are spaced from the plane of the feed network by dielectric spacing means (not shown) so that the feed network is spaced from both ground planes. In practice the feed network can be formed by conventional printed circuit techniques on a fibre glass board and the ground planes have been stamped out of aluminium sheets. Spacing between the network and the ground planes can be determined by foamed dielectric sheets, dielectric studs interposed between the various layers or by expanded polystyrene.

Figure 2:
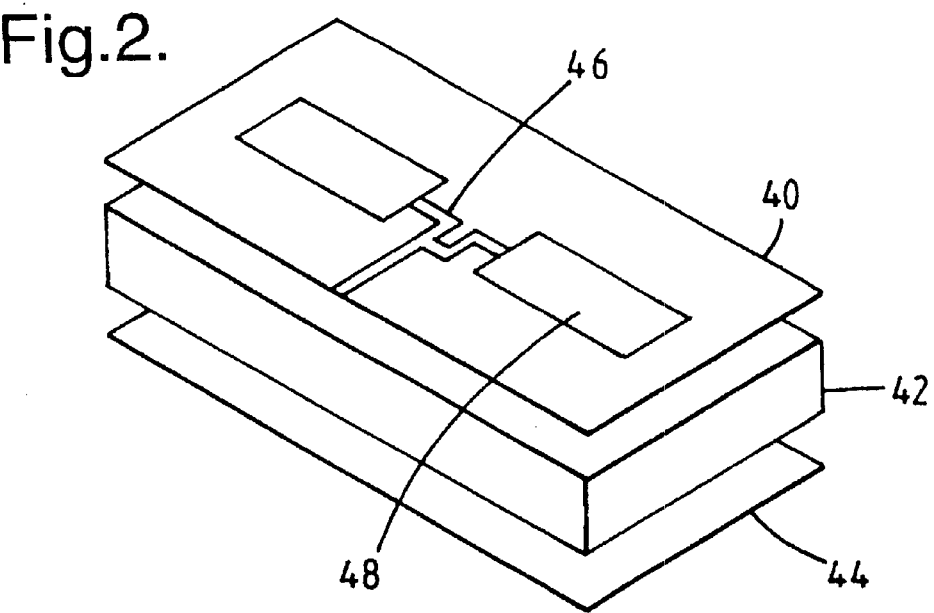
FIG. 2 shows a second type of antenna.

A second type of antenna, a patch antenna array, is shown in FIG. 2 which comprises a dielectric film 40, a dielectric spacer 42 and a ground plane 44. The dielectric film supports a feed network 46 which leads to several patch radiating elements 48. As with the dielectric spacers of the antenna shown in FIG. 1, the dielectric film is spaced from a ground plane reflector by a spacer such as expanded polystyrene.

We have found that it is possible to produce an antenna conductive plane substrate from expanded polystyrene. By applying a special two stage moulding technique, an expanded polystyrene dielectric substrate can be produced which has a particularly smooth surface to which a conductive coating may subsequently be applied. Thus, for example, a light weight ground plane substrate can be produced.

The manufacture of the dielectric will now discussed, by way of example only: In the first instance, polystyrene granules are prepared for moulding in an initial stage wherein the granules of a size 0.05–0.1 mm in diameter and of a weight of 1000 g/l are expanded to a first expanded state by passing steam at 110° C. through the granules, as they are fed into a ventilated silo. Polystyrene is typically stored in pentane for storage. The granules or beads as perhaps they are better described after expansion are then allowed to cool and dry. At the same time the pentane gas, which is heavier than air, is allowed to dissipate. Appropriate gas exhaust equipment should be utilised: pentane is flammable. The spaces vacated by the pentane is replaced with air. The ventilated silo has a mesh like structure to allow the passage of gases.

After being left to dry and evaporate for six hours, the partly expanded beads are introduced into a two-position mould cavity in a first position dimensioned to enable a uniform distribution of beads having a gap of around 4 mm. At this stage the beads are of 3–4 mm across and the density is around 25–40 g/l. The size of the cavity is then reduced and steam is passed through the polystyrene. The steam is typically at a slightly raised pressure e.g. in the region of 1.0–1.1 bar and at 110° C. In tests, in producing a dielectric of 28 cm diameter and of 2 mm thickness, steam was passed across from one face to the other for five seconds and then in a reverse direction for a further five seconds. This further passing of steam causes the air which has diffused into voids of the polystyrene to cause the heated beads to expand and coalesce.

No heating of the mould is normally necessary. Subsequent to this, the pressure within the mould is reduced to a partial vacuum whereby the polystyrene cools and assumes a solid state and the moisture due to the steam is removed for a period of ten minutes, although this period can, of course be varied. The polystyrene substrate is then removed and dried in a heated, dry atmosphere for a period of three hours or so. The density of the substrate is now about 70 g/l.

Figure 3A:
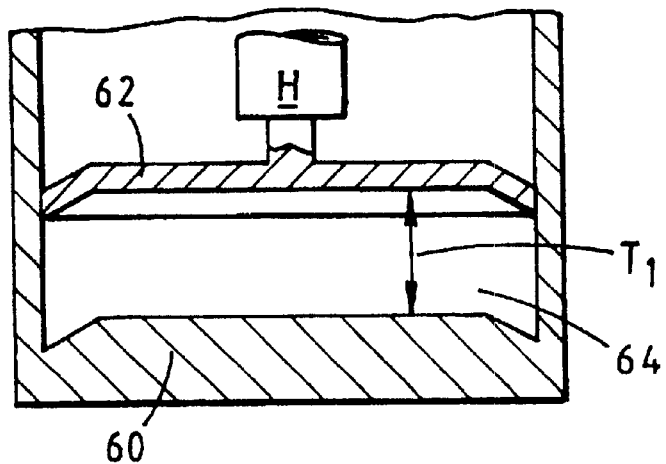
FIGS. 3a and b show two stages in the manufacture of a polystyrene antenna ground plane.
Figure 3B:
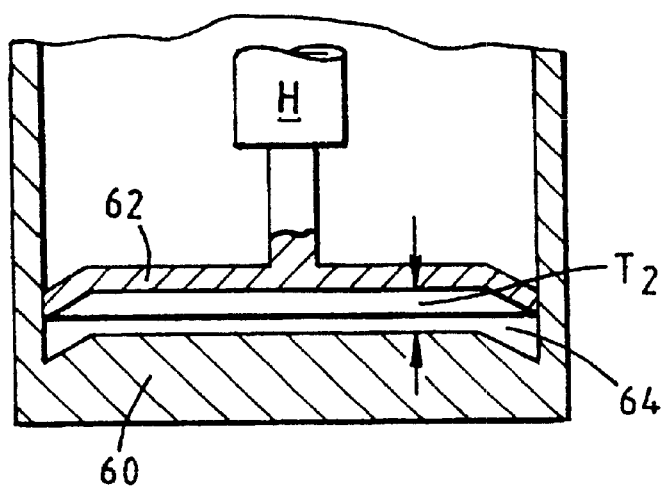

Referring now to FIG. 3a, there is shown a simple mould comprising two main components: a first, fixed mould portion 60 and a second mould portion 62 which is movable relative to the first mould portion. The chamber 64 enclosed by the mould portions has inlets (not shown) whereby polystyrene beads and steam may be passed. The mould halves are formed of a corrosion resistant material which will withstand temperature cycling and is preferably easily machined or cast. An aluminium alloy is appropriate in many cases. As can be seen the chamber has a thickness T1 between the major faces of the mould halves. The mould portions will be shaped as appropriate for the type of antenna desired: for instance, there may be depressions in the design to correspond in position to the patch elements of a design. As seen in FIG. 3b the second mould portion is brought towards the first mould portion to realise a mould separation thickness T2. Reference letter H denotes a hydraulic ram for moving the mould parts relative to each other. The experimental tests were carried out using polystyrene granules marketed under the name STYROSHELL and sold by the Shell Petroleum Company.

By the use of this two stage manufacturing process, substrates having a thickness of less than 2 mm can reliably be produced, with a high degree of surface smoothness and cell closure. The use of steam as an expanding agent requires the use of no other solvents, release agents or the like. Accordingly, the removal of such agents is not required for any subsequent process. Further, no measures to encourage keying are generally required for subsequent surface treatment. Such two-stage polystyrene may therefore be easily coated to provide a surface of uniform smoothness suitable for use in antenna applications, where a correct spacing between successive substrates may be maintained. It is important that the ground plane and other substrates have a uniform consistency whereby the microwave parameters required to meet the overall antenna performance are not compromised. Polystyrene can provide a dielectric spacer having a dielectric constant which is close to that of air—i.e. near unity dielectric constant, and is of low loss. Limited production runs have enjoyed zero failure rates for a dielectric spacer with a smooth surface of controlled thickness of 0.1 mm.

In order for the polystyrene dielectric to perform as a ground plane, it needs to be provided with a conductive coating. Preferably, the conductive coating is a metal coating applied as a spray coating as from an aerosol or otherwise, such as an aqueous-based metallic paint such as the one sold by the Acheson Company under the ELECTRODAG name, which comprises silver plated copper pigment suspended in a thermoplastic resin binder employing water as the diluent. A thin (~50 $\mu$m) metallic layer can thereby be reliably applied to the moulding. A spray coating can be optimised to give the required electrical characteristics for the conductive coating: ELECTRODAG is preferably applied by spray, with a recirculation system being employed from the pot to the spray gun to ensure good uniformity. The concept of metal spraying the back of the lower spacer of an antenna to replace a metal ground plane which was otherwise to have been positioned against the spacer, was made possible by the above method of manufacture, where the smooth finish gave minimal interstitial voids between the expanded polystyrene beads. The intimate placement of the aqueous metal sprayed low resistance coating onto the base of the lower spacer removes the tolerance build up which would otherwise occur between the ground plane and the spacer due to any air gaps being formed by surface irregularities or bowing between the spacer and the now redundant plate.

Highest efficiency can be achieved using high volume, low pressure spray guns due to the minimisation of over spray losses. Conventional propeller agitated pressure pot systems may also be used, but the transfer efficiency is less. It is preferred that metals in contact with the coating are of 304 or 316 grades of stainless steel. The metal pigment is ideally of high conductivity such as silver, which can give a sheet resistivity of less than ~0.05 $\Omega$ per square at 15 $\mu$m thickness, but a more economic silver plated copper is preferred which can give a sheet resistivity of ~0.25 $\Omega$ per square at 50 $\mu$m thickness. The use of nickel is also possible but has a sheet resistivity of ~0.5 $\Omega$ per square at 50 $\mu$m thickness. Because of the smooth surface of the polystyrene, other coatings can be applied to give low loss microwave finishes.

A further advantage in the use of a dielectric as a support surface is that the dielectric substrate can provide the spacing means whereby the ground plane is maintained at a uniform distance from the feed network. Accordingly, the use of a dielectric substrate which is coated with a conductive layer in one or more areas can reduce the number of components employed in the manufacture of an antenna, simplifying the manufacture and also reducing the overall costs. The polystyrene substrate may, for example, carry a ground plane on a first side and radiating elements (and associated feed network) on a second side. Further, the second side may also carry grounded areas to suppress unwanted modes.

In use, the antenna ground plane will function as any 'normal' metallic ground plane in that microwave currents may be propagated between a transmission line printed on a dielectric film and a conductor coated dielectric made in accordance with the invention. The ground plane as provided by this invention is not restricted to that of a reflective back plane; metallic apertured ground planes may be replaced with the coated dielectric. In low power applications, it is also possible to print the radiating elements and microstrip feed network therefor upon an expanded polystyrene substrate. It is therefore possible to provide an antenna employing no metallic ground plane structures as such. In some applications the ground plane could also function as an EMC shield around control electronics associated with the antenna. Contact of the conductive coating with a potential may be performed by a pressure contact arrangement. The dielectric substrate having a smooth surface which is conductive is suitable for many non antenna applications In certain applications, such as in aerospace/avionics a very light non-metal antenna structure may be realised. Rigid plastics mouldings in glass fibre may be used to maintain shape and strength of the structure. A further advantage of the invention is that conformal structures may be very easily implemented.

What is claimed is:

1. A layered antenna assembly comprising:

antenna radiating elements and a feed network; and a ground plane element produced by the method of:

heating unexpanded polystyrene bead to a partly expanded state;

compressing said partly expanded beads and further heating in order to force further bead expansion into the gaps between said beads in order to produce a substantially pore free polystyrene dielectric layer; and depositing a metallisation layer onto a surface of said dielectric layer.

2. A ground place element produced by the method of:

heating unexpanded polystyrene bead to a partly expanded state;

compressing said partly expanded beads and further heating in order to force further bead expansion into the gaps between said beads in order to produce a substantially pore free polystyrene dielectric layer; and depositing a metallisation layer onto a surface of said dielectric layer.

3. A method of producing a ground plane element for layered antenna assembly, the method comprising:

heating unexpanded polystyrene bead to a partly expanded state;

compressing said partly expanded beads and further heating in order to force further bead expansion into the gaps between said beads in order to produce a substantially pore free polystyrene dielectric layer; and depositing a metallisation layer onto a surface of said dielectric layer.

4. A method as claimed in claim 3 wherein said expansion of the polystyrene beads is by passing steam over said beads.

5. A method as claimed in claim 3 further comprising drying and distributing said partly expanded beads to have substantially uniform gaps therebetween; prior to said compression.

6. A method as claimed in claim 3 further comprising applying a partial vacuum to said dielectric layer.

7. A method as claimed in claim 3 wherein said metallisation layer is deposited by spraying.

8. A method as claimed in claim 7 wherein said spray is an aqueous-based metallic paint.

* * * * *